Figure 12:
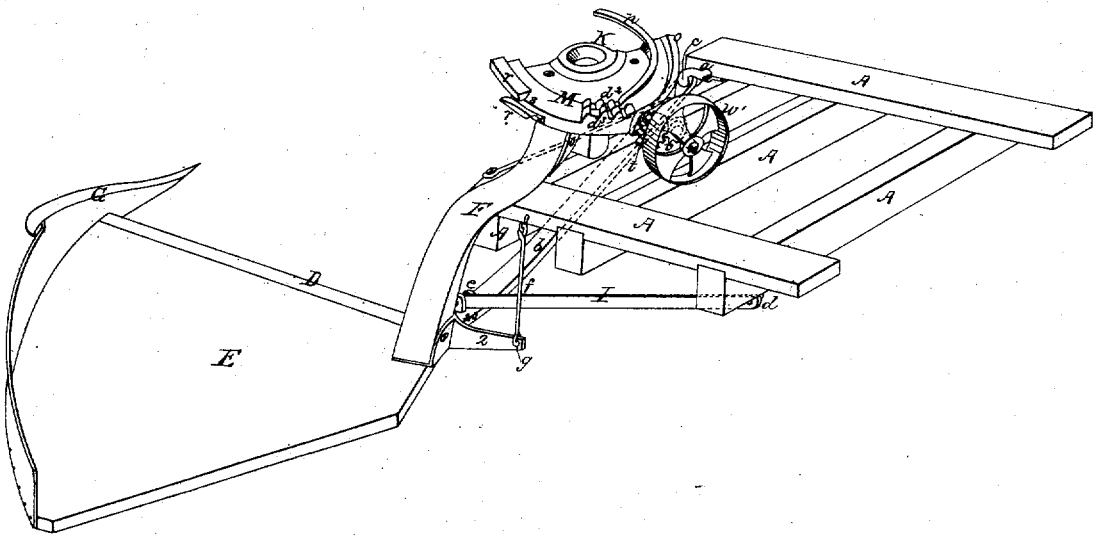

3 Sheets—Sheet 1.
R. HOFFHEINS.
HARVESTER.
No. 2,224. Reissued Apr. 10, 1866.
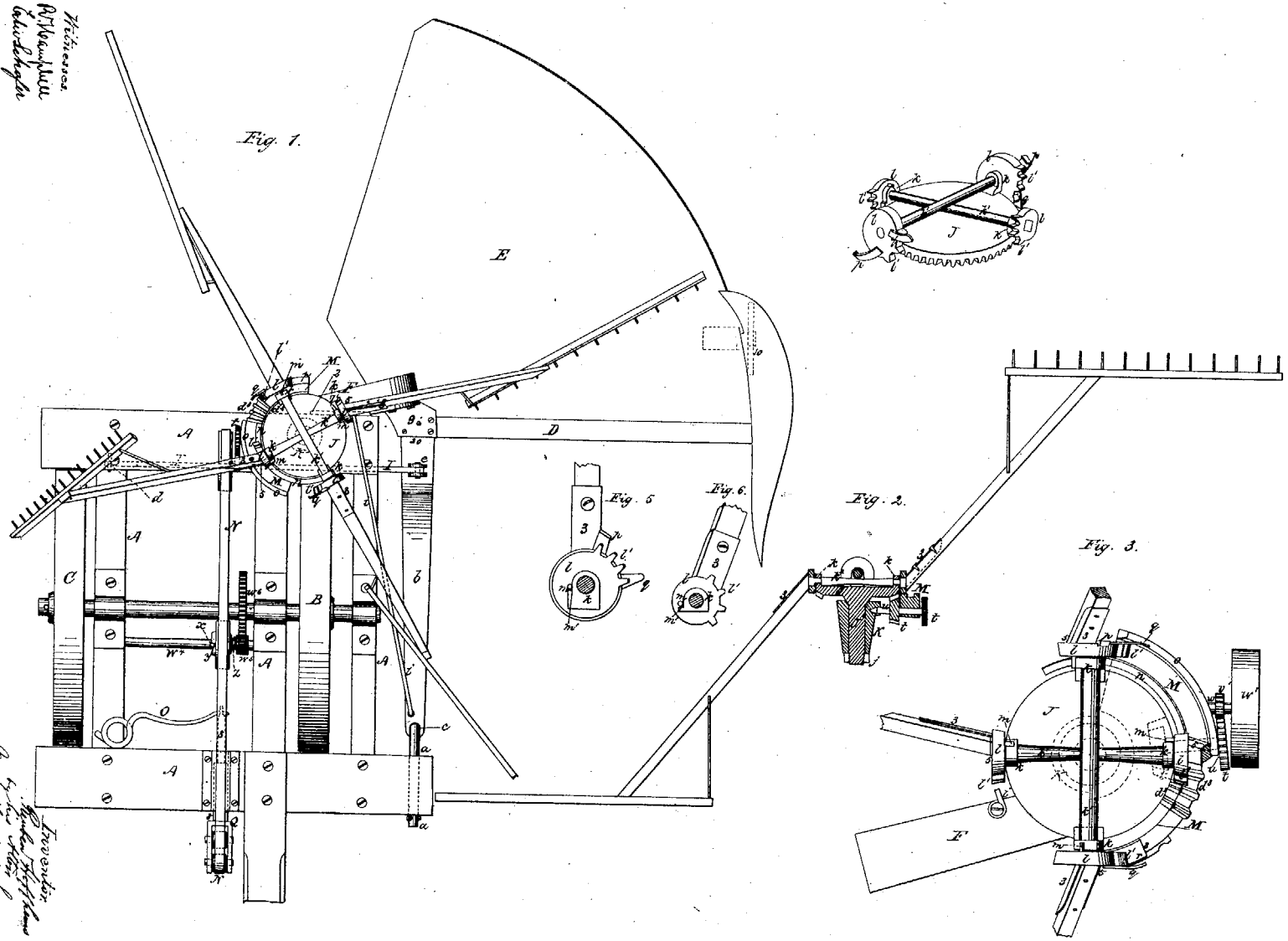
Witnesses.
R. Wampfield
Edw. Schafer
Inventor.
Reuben Hoffheins
by his Atty
Mason, Fenwick & Lawrence
N. PETERS, Photo-Lithographer, Washington, D. C.

3 Sheets—Sheet 2.
R. HOFFHEINS.
HARVESTER.
No 2,224. Reissued Apr. 10, 1866.
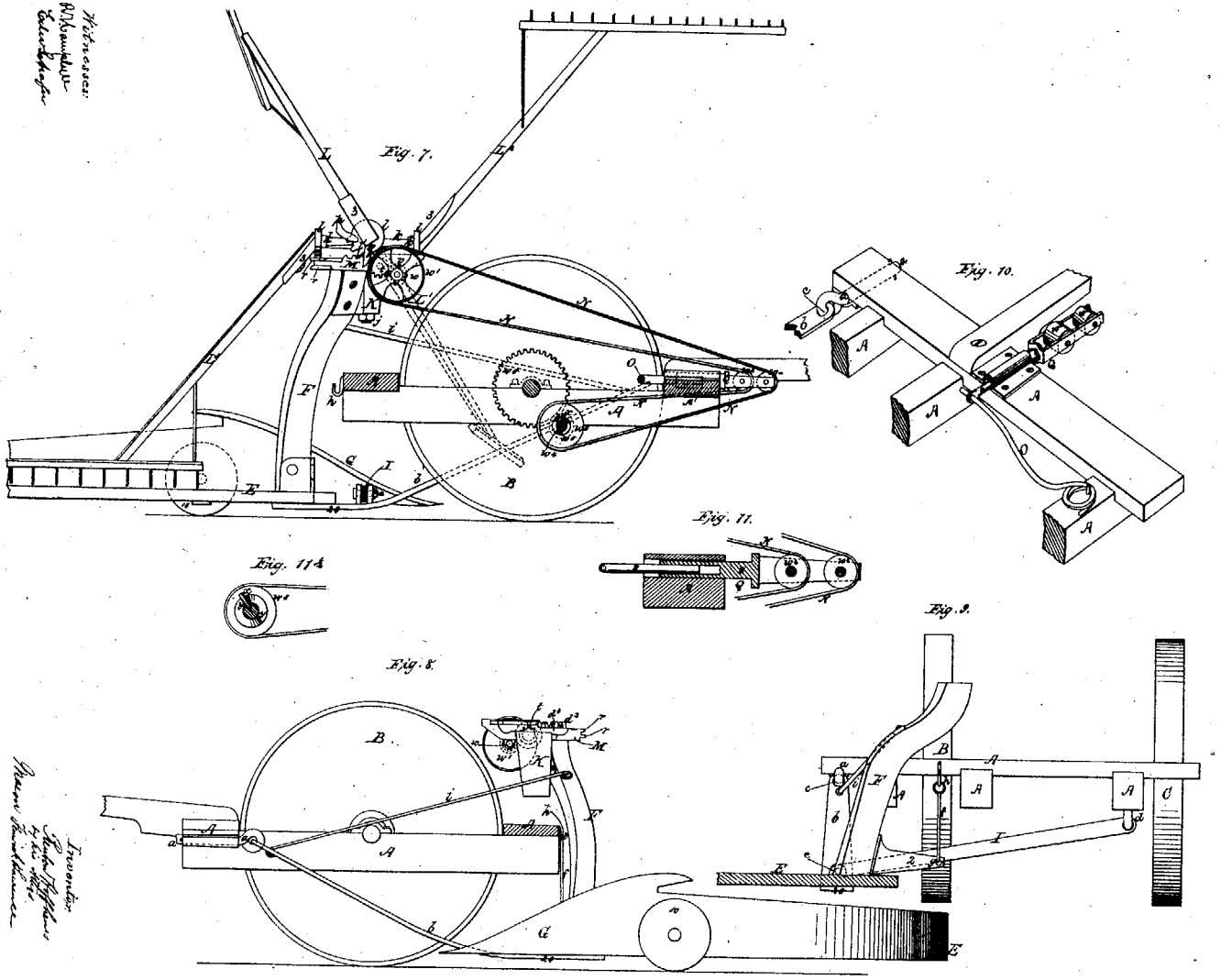
N. PETERS, Photo-Lithographer, Washington, D. C.

3 Sheets—Sheet 3.

R. HOFFHEINS.

HARVESTER.

No. 2,224. Reissued Apr. 10, 1866.

Witnesses:
R. V. Campbell
Edw. Schafer

Inventor:
Reuben Hoffheins
by his Attys
Mason, Fenwick & Lawrence

N. PETERS, Photo-Lithographer, Washington, D. C.

UNITED STATES PATENT OFFICE.

REUBEN HOFFHEIMS, OF DOVER, PENNSYLVANIA.

IMPROVEMENT IN HARVESTERS.

Specification forming part of Letters Patent No. 35,315, dated May 20, 1862; Reissue No. 2,224, dated April 10, 1866.

*To all whom it may concern:*

Be it known that I, REUBEN HOFFHEIMS, of Dover, in the county of York and State of Pennsylvania, have invented certain new and useful Improvements in Machines for Harvesting Grain and Grass; and I do hereby declare that the following is a full, clear, and exact description of the same, reference being had to the accompanying drawings, forming part of this specification, in which—

Figure 1, Sheet 1, is a plan or top view of a harvester embodying my invention. Fig. 2 is a vertical section of the combined rake and reel of the harvester, detached from its support. Fig. 3 is a plan or top view of the same mounted upon its support. The arms of the rake and reel are shown as partly broken off. Figs. 4, 5, and 6 are details of part of the mechanism for driving the combined rake and reel and for inverting the rake and reel arms. Fig. 7, Sheet 2, is a side elevation of the harvester through the draft-frame, the rake-platform and other parts being shown in elevation. Fig. 8 is a side elevation of the machine, seen from the grain side of the platform. Fig. 9 is a rear elevation of a portion of the machine, showing the manner of suspending the rake and reel support upon the hinge-joint finger-beam or platform thereof. Figs. 10, 11, and 11½ are details of the harvester, showing more plainly the devices for tightening the driving-belt during the rising of the finger-beam on its hinge joint or joints, also the clutch-pulley by which the rake is ungeared. Fig. 12 is a perspective view of a portion of the machine, as seen from the rear thereof.

Similar letters of reference in the several figures indicate corresponding parts.

In the application of automatic rakes to harvesters which employ a "hinge-joint cutting apparatus," it is important to have the rake so contrived that the application may be readily made to the approved and commonly-used side-draft machines which are constructed with the "single" or the "double" joint cutting apparatus. It is also important to have the axis of the rake suspended between the inner drive-wheel and the outer shoe or divider, or at the left of the suspending hinge-joint of the finger-beam and platform, and near to the heel of said beam; and, in connection with this arrangement or location of the axis or support of the rake, it is also important to have the suspension of the rake made in such a manner that the base of the support of the axis of the rake is wholly upon the hinged finger-beam or the platform thereof, and also that the rake, the finger-beam, and the platform shall be rigidly connected together and still be free to rise together the requisite distance by articulating on the single or the double hinge-joint connections and the suspension device of the harvester, so as to conform to the irregularities of the surface of the ground, or to move clear of stumps and other obstructions; and, while thus rising to conform to the ground or to pass obstructions, it is important that the great weight of the rake, finger-beam, and platform shall not cause the draft-frame to tilt over on its right-hand drive-wheels by sudden and abrupt motions, but shall tend to insure a square run of the draft-frame upon the ground during the "pitching" or rising and falling motions of the finger-beam, platform, and rake, and thus an even and easy draft for the team be secured; and, further, in this connection it is important to have a rake suspended as above stated, in order that it may be applied in connection with a finger-beam and platform which are hung upon a double hinge-joint. I mean by a "double hinge-joint" that character of connection which allows the cutting apparatus of harvesters to tilt up at its outer end, on a hinge located nearly in line with the heel of the finger-beam, and also allows it to rise bodily at both its inner and outer ends on another joint or yielding connection, which is located some distance to the right of said heel of the finger-beam. It also is further important in making an attachment of a rake to a harvester to have as little obstruction as possible offered by the inner portion of the finger-beam and by the suspending-connections, beyond the left-hand drive-wheel and beneath the draft-frame to the grass and other substances which are liable to accumulate and clog the machine. Hence the finger-beam and cutting apparatus should terminate at or near to the left-hand drive-wheel of the draft-frame. It is also further important in connection with a combined rake and reel mounted upon a hinge-joint cutting apparatus; and also in connection with any rake and with any reel mounted upon such a cutting apparatus, to so apply the endless driving-belt or its equivalent that it shall not be allowed to become slack and slip on its pulleys, by reason of the cutting apparatus and rake or the reel rising and falling in conformity with the surface of the ground.

In order that others skilled in the art to which my invention relates may be enabled to fully understand and use the same, I will proceed to describe one practical mode of constructing and using the same; but I do not limit myself strictly to the details of construction herein given.

In the drawings, A represents the draft-frame, consisting, in this instance, of three longitudinal and two transverse beams, a tongue, an axle, and two supporting-wheels. The left-hand supporting-wheel, B, is made fast on the axle, while the right-hand supporting-wheel, C, is left loose, so as to revolve free of the axle. Any well-known way of attaching these wheels and controlling them may be adopted.

D is the finger-beam and E the platform of the harvester, the cutting apparatus and guard-fingers being left off.

F is a support for a combined rake and reel. This support is mounted rigidly upon the inner front corner of the platform and heel of the finger-beam; but it may be mounted either wholly on the finger-beam or wholly on any part of the platform which is to the left of the left-hand drive-wheel, B, or to the right of said drive-wheel, if it is a right-hand machine. From the platform or finger-beam the support may extend in an inclined position as high as the top of the draft-frame, and then take a turn over toward the center of said frame, as represented, so as to form a support for the rake and reel, which shall be somewhat higher than the frame and between the two drive or supporting wheels. The particular shape and height of this support is not very material, so long as the base is affixed at some point between the center of the main frame A and the outer shoe or divider, G. The finger-beam which I adopt does not extend to the right beyond the left-hand drive-wheel, B, and the platform is of the quadrant form, with the inner front corner cut away, as represented. The particular form of the platform is not very material, but its inner corner should not extend much beyond the left-hand drive-wheel, B.

At the upper end of the support F a sweep-rake, of the character represented or of any other suitable construction, is attached, so as to revolve or turn upon its axis. I shall hereinafter particularly describe the rake which I have represented.

The finger-beam, platform, and rake I suspend and stay in the following manner: On the front transverse beam of the draft-frame, at the left of the left-hand drive-wheel, B, I construct a swiveling device, *a*, and to this device an inclined draw-bar, *b*, is hinged or jointed, as at *c*. This draw-bar is extended back to near the rear end of the draft-frame into the form of a shoe, 20, or a separate inner shoe may be first constructed as a part of the cutting apparatus and this draw-bar connected rigidly to such shoe. In either case the finger-beam and the inner corner of the platform are attached rigidly to the rear part of the draw-bar, as represented. At a suitable angle to this draw-bar an inclined bar or rod, I, extends from the under side of the right-hand longitudinal beam of the draft-frame to the draw-bar. This bar or rod I is connected at its respective ends to the draft-frame and to the draw-bar by means of joints *d e*, which allow a vertical movement of the finger-beam, platform, and rake. The joint-connection *a* is in the same longitudinal path as that *e*, but is at a different altitude. The joint-connection *d* is diagonal to that *a*, so far as arrangement or location is concerned, but is on about the same level therewith. All these joint-connections are or may be in a straight line with the run of the machine, although arranged in different paths. From the inner corner of the finger-beam or platform, or from the metal foot-piece 9 of the rake and reel support, by which the support is screwed to and braced on the platform and finger-beam, a strong bracket, 2, is extended beyond the left-hand side beam of the draft-frame. To the extremity of this arm a swinging link or chain, *f*, is loosely connected or jointed, as at *g*, and by means of this link or chain the finger-beam, platform, and rake, although arranged at the left of the left-hand drive-wheel, B, can be suspended from a point which is to the right of the said left-hand side beam. The suspension is effected by hinging the upper end of the link or chain to the rear beam of the draft-frame, as represented at *h*. In order to stay the rake, a diagonal rod, *i*, is rigidly fixed to the drag-bar *b* and to the rake-support *f*, as represented. From this description it will be seen that the finger-beam, platform, and rake are entirely suspended and braced by devices which can articulate free of the draft-frame; or, in other words, these parts in articulating do not tilt the draft-frame. The arrangement is also such that the top portion of the draft-frame is not cumbered with the rake-support. The arrangement is also such that a well-balanced and a very light and cheap automatic-raking harvester can be produced. The arrangement likewise is such that a short finger-beam, short or narrow platform, and a rake with a short sweep can be adopted, and thus a chance for grass and rubbish to hang upon and clog the machine at a point in rear of the draft-frame is avoided. Much labor of getting the grain off the platform is also saved.

The apparatus which I have represented for getting the grain properly up to the cutting apparatus before it is cut, and off of the platform after it is cut, consists as follows:

J is a horizontal crown-wheel with cog-teeth on its under side. This wheel has a vertical conic-shaped axle, J′, projecting from the under face, and said axle is set down into a metal box, K, attached to the upper portion of the support E, as represented. The crown-wheel and its axle revolve together, any upward movement being prevented by the nut *j*, which fastens the wheel to the box K. On the top of the crown-wheel, at equal distances apart, four lugs, *k k k k*, are formed, and horizontally through the lugs round holes are formed, and through these holes two shafts, *k′*, crossing each other at right angles and centrally, are passed, as represented, so as to revolve a certain distance. At each end of the respective shafts a circular wheel, *l*, with a toothed segment, *l′*, formed on its circumference, is affixed rigidly. Each of these wheels has a stop-pin, *m*, projecting from its inner face over a shoulder, *m′*, of the respective lugs *k k* of the crown-wheel, as represented. These pins and stops are so placed that the shafts *k′ k′* can only revolve the length of the toothed segments. From the face of each of the segments an oblique bracket, 3, extends in the manner represented in Figs. 1, 2, and 3. The bracket at one end of each of the shafts *k′ k′* extends downward in an inclined direction, and that at the other end of each of the shafts extends upward in an inclined direction, thus forming angles with the shafts *k′ k′*, as shown in Fig. 2. These brackets are also made to form angles with radial lines through the crown-wheel, as indicated at 5 5 5 5. To one pair of these brackets angular reels L L′ are rigidly fastened, and to the other pair angular rakes $L^2$ $L^3$ are similarly fastened. The respective rakes and reels are arranged with the peculiar obliquity represented, so as to more effectively operate upon the standing grain and also remove the cut grain from the platform. It will be observed that they stand oblique to a vertical and horizontal plane. The angular form of the rakes and reels enables me to employ a guideway, which is perpendicular to the top of the platform, as with this form the descent of one of the rakes or one of the reels of the respective pairs of rakes and reels necessarily causes an ascent or inversion of the other.

In order to produce a proper motion in the rakes and reels the following devices are provided:

M is a stationary segment-plate with two concentric sets of cog-teeth, $d^2$ $d^3$, on its upper face. This plate is cast with or fastened to the box of the support of the rakes and reel in such manner as to partly encircle the crown-wheel J. The toothed segments of the rakes, as shown in Figs. 1 and 2, take into the smaller segment, $d^2$, of stationary cog-teeth, and the toothed segments of the reels take into the larger segment, $d^3$, of stationary cog-teeth. On the segment-plate M, I have constructed horizontal ways or guides *n o*, for holding up the rakes and the reels on one side of the crown-wheel, while those on the other side are in the acts of reeling in and of raking off the grain. These guides are of just such a length that they set the rakes and reels free on one side of the crown-wheel the moment those on the other side thereof are done their work and are turned up out of the way of the drive-wheel of the draft-frame. If the stationary teeth of the way M are in line with the way *n*, one of the teeth of the respective segment-wheels, in connection with the untoothed portion of said wheels, will serve to hold the rakes or reels of the respective pairs of rakes or reels in proper position; but if the way, as at *o*, is not in the same circle with the teeth, then a hook-shaped tooth, *p*, and another tooth, *q*, may be formed on the respective segments of the pairs of rakes and reels, and the hooked tooth, by passing between flanges *r r*, which terminate at *s*, will answer for preventing the wheel-segments turning before they are properly in gear with the teeth of the stationary segment, and as soon as the wheel-segments have properly turned the rake and reel of one pair of the rakes or reels, the other tooth, *q*, will rest upon the way *o* and hold the rakes or reels from turning until the proper time. Either of the two plans for turning and controlling the rakes and reels may be adopted for the whole series of rakes and reels.

In order to produce a rotary motion of the crown-wheel, I arrange two pinions, *t t*, on a shaft, *u*, which is supported on the box of the crown-wheel shaft. One of these pinions gears with the crown-wheel and the other with a pinion, *v*, of a pulley-shaft, *w*, which is supported on the segment of the box K, as represented. The shaft *w* carries a pulley, $w^2$, and from this pulley an endless belt, N, passes to and around a pair of small pulleys, $w^2$ $w^2$, and from thence to a sliding clutch-pulley, $w^3$, which is on a shaft, $w^4$, driven by cog-gearing $w^5$ $w^6$, the motion being derived from the axle of the draft-frame, as will be evident from the drawings.

In order to insure a positive action of the belt upon the pulleys, I construct the support Q of the small pulleys $w^2$ $w^2$ in two parts, 8 8, as represented in Fig. 11, and arrange a spring, O, to act upon the said support in such a manner as to always keep the belt taut. By having the pulley-support made in two parts, one of which is cylindric and fits in a cylindric socket of the other part, as shown, the small pulleys are allowed a chance to swivel, so as to accommodate themselves to all changes in position which the pulley *w′* makes by reason of the finger-beam, platform, and rake rising and descending. The clutch-pulley is so arranged and made to gear with the shaft by means of a pin, *x*, ratchet-teeth *y*, and a spring, *z*, that it can be thrown in and out of gear at will, and when the machine is backed will cease automatically to gear with its shaft.

The belt-tightener described will be found very useful in connection with all descriptions of reels and rakes which are mounted upon a hinged-joint finger-beam or the platform thereof and are driven by an endless belt.

In representing a rake and reel combined, I have shown two rakes in the same line and two plain reels in a line with one another; but it is obvious that any even number of rakes and reels may be adopted or that any number of the plain arms may be provided with teeth, as preference or the nature of the work may dictate, and also that any other equivalent devices to those described for turning up and controlling the arms may be employed without departing from my invention, as I do not restrict myself to the specific means described for accomplishing the result.

It will be observed that the platform is so suspended at the left of the inner drive-wheel, and also so supported, as to be capable of rising and falling to conform with the utmost freedom to the inequalities of the surface of the ground, and, as the standard or support is rigidly mounted upon the platform, that the rake and reel are supported in an unchanging position in relation to the platform, and that, too, without any obstruction to the free motion of either. The mounting of the rake upon the platform or cutting apparatus causes the former not only to follow the vertical deflections of the latter, but to rise and fall with it as it is elevated and depressed. The correct relation, both in height and in angle, is thus maintained between the platform and rake under all conditions, while my mode of suspension is such that there is very little, if any, tendency to tilt over the draft-frame.

The spring belt-tightener is such that it maintains the band at an equal tension in all positions of the pulley, and thus insures a perfect operation of the reel and rakes under all circumstances.

The suspension of the rake and reel with the platform and finger-beam, by means of the extension 2 and link or chain, transfers the weight upon the draft-frame in such a manner that the said frame is kept square upon the ground; and, besides, this mode of suspension lessens the extent of deflections of the rake and renders them less sudden and abrupt.

Operation: If it is desired to cut grass with the machine represented, the rake and platform, with the wheel 10, are removed by unscrewing the metal foot-piece 9 and detaching the link *f*. This allows the shoe of the draw-bar to rest on the ground in customary manner, while the grain side of the machine rests upon the ordinary supporting-shoe. (Not shown.) Thus both ends of the finger-beam are left free to rise and fall to conform to undulations in the surface of the ground. If it is desired to cut grain, the shoe of the draw-bar and the heel of the finger-beam, and the rake and platform, which have been replaced, are suspended by the link or chain, as represented and herein described.

The cutting apparatus (which is not represented) may be constructed and operated in any known and suitable way.

As the rake-head or crown-wheel receives its continuous rotary motion from the endless belt the respective pairs of reel and rakes are carried along with it and during their circuit they are caused to assume the different positions represented in Figs. 1, 2, and 7, by the combined agency of their form, the segment-wheels, and segment-plate. As each reel approaches the rear of the main frame its cogged segment *l* takes into the cogs $d^3$, turning the reel backward and upward, completely above the drive-wheels of the draft-frame, and causing the reel, which is attached in front to the same shaft $k'$, to descend at the left side of the drive-wheel, where it operates to present and hold the standing grain to the action of the cutters, and so passes over the platform. By the time that this last reel reaches the point to be elevated above the left-hand drive-wheel, the first-mentioned reel has advanced so far as to pass off the way *o* and descend clear of the said drive-wheel, and so the work of reeling progresses. In like manner the rakes operate first as reels, and each, passing backward in contact with the platform, removes therefrom all the grain which has collected and deposits it in a gavel upon the ground. On passing off the platform the rake is held and guided, after being turned up, by the segment-wheel *l* and the way *n* until its fellow rake has finished its work. With the present arrangement, when the acting reel has passed off the platform it is held and guided by its tooth *p*, passing between the flanges *r r s*, and its cog-segment $l'$ is thereby presented in correct position to the cogs $d^3$, by means of which it is elevated, as above described. The elevated reel is sustained by the tooth *q*, resting upon the way *o*, until it has passed around sufficiently far to clear said way and descend clear of the wheel B, when the tooth *q* leaves the way *o* and the reel is carried down by the ascent of its fellow reel.

In describing the location of my rake, or reel and rake combined, I have used the terms "right" and "left" simply in order to make myself understood as to what relation with respect to the grain side of the harvester the rake, or reel and rake combined, is to occupy. I wish to be distinctly understood that I do not confine my invention to a left-hand machine, as the rake, or rake and reel combined, if placed on the right-hand side of the machine in just the same location that it occupies on the left-hand side thereof, will operate in the same manner with the same results.

What I claim as my invention, and desire to secure by Letters Patent, is—

1. A sweep-rake which is mounted upon the heel of the finger-beam proper or upon the inner front corner of the platform of a harvester which has its cutting apparatus and platform hinged to the draft-frame, all in such manner that the rake-arm sweeps the platform from front to inner side and maintains a correct position in relation to the finger-beam and platform during the rising or falling movements thereof on the joint or joints by which the finger-beam is connected to the draft-frame, substantially as set forth.

2. A rake rotating upon an axis which is perpendicular to the top surface of the platform, or nearly so, and having its arms successively turned up, substantially as and for the purpose described.

3. The angular rake-arms, rotated independently of the axis *f*, and controlled, substantially as described, in combination with a guideway which is perpendicular, or nearly so, to the said axis *f* of the rake-head, substantially as and for the purpose described.

4. Elevating and depressing revolving rake and reel arms by means substantially as described, whereby I am enabled to dispense with an incline plane or camway, as set forth.

5. An inclined standard or support, F, or its equivalent, rigidly mounted upon a loosely-hinged platform or finger-beam, and adapted for supporting a sweep-rake in an unchanging position in relation to said platform without obstructing the free motion of the platform or finger-beam, substantially as described and shown.

6. A standard or support, F, which sustains the sweep-rake above the draft-frame or driving-wheel thereof, said standard being mounted directly and wholly upon a hinged finger-beam or the platform thereof, substantially as described, and for the purpose set forth.

7. A revolving toothed head or crown-wheel, J, constructed with supports for rake and reel arms, in pairs, said supports being arranged outside and around the axis of said wheel J, substantially as and for the purpose described.

8. In a harvesting-machine which has its cutting apparatus hinged or jointed to the main frame in such manner as to allow it to conform at both ends to the undulations of the ground, and a rake mounted upon the said jointed cutting apparatus or upon the platform thereof, so constructing and arranging the several parts that the support of the rake can occupy a position outside of the inner drive-wheel, B, or a position which is between the point of suspension *h* and the outer divider, G, and can also be hung or be suspended below the draft-frame, substantially as described.

9. Effecting a combination of a rake and reel, located substantially as described, and a finger-beam and platform with the main frame by means of a hinged draw-bar, *b*, a hinged brace, I, a hinged suspender, *f*, and an extension-bracket, 2, or their equivalents, substantially as and for the purposes described.

10. The combination of a rake and reel, a yielding draw-bar, *b*, inner shoe of the cutting apparatus, and hinge-joint *e* on the draw-bar, substantially as and for the purpose described.

11. Preventing a too sudden or abrupt deflection of a rake and reel mounted upon a hinged-joint cutting apparatus by carrying the point of suspension beyond the rake-support toward the center of the draft-frame, by means substantially as described.

12. A continuously-revolving rake, which is mounted directly and wholly upon the platform or finger-beam, so as to rise and fall therewith independently of the draft-frame, when said rake is located between the center of the draft-frame and the outer divider, and passes in at the front of the machine upon the platform and sweeps around to the inner side of the platform, substantially as described.

13. The combination, with a double-hinged-joint combined reaping and mowing machine, of a sweep-rake which enters at the front of the machine upon the platform in such manner that the rake and cutting apparatus rise and fall together while reaping, and also in such manner that the rake and platform may be readily removed and the cutting apparatus, at its inner and outer ends, allowed to float upon the ground and to accommodate itself at both ends to the undulations of the ground, substantially in the manner described.

14. The combination of a suspended hinge-joint cutting apparatus of harvesters and a combined rake and reel, which is mounted directly and wholly upon the suspended platform or hinged finger-beam, substantially as and for the purpose described.

15. Controlling the rake and reel arms by an upper and lower guide, between which an attachment of the respective rake and reel arms passes, substantially as described.

16. The combination of a combined rake and reel, mounted upon a hinge-joint cutting apparatus, and a yielding belt-tightener, substantially as and for the purpose described.

17. The employment of a yielding belt or chain tightener or its equivalent in connection with harvesters which are constructed with a hinged-joint cutting apparatus, substantially as and for the purpose described.

18. The pulley-support Q, with its pulleys $w^2$ $w^2$, in combination with a band or chain, N, and pulleys $w'$ $w^3$, substantially as and for the purpose set forth.

19. Providing, in a harvester with the rake attached to its hinged finger-beam or platform, an extensible means for driving the rake, which will permit the platform and rake to rise and fall together and accommodate themselves independently of the draft-frame to the undulations of the ground, substantially as described, and for the purpose set forth.

REUBEN HOFFHEIMS.

Witnesses:
OCTAVIUS KNIGHT,
CHARLES SMITH.